United States Patent [19]
Chang et al.

[11] Patent Number: 5,719,730
[45] Date of Patent: Feb. 17, 1998

[54] LOW FRINGE-FIELD AND NARROW WRITE-TRACK MAGNETO-RESISTIVE (MR) MAGNETIC READ-WRITE HEAD

[75] Inventors: Jei-Wei Chang, Cupertino; Kochan Ju, San Jose; Yimin Guo, Sunnyvale; Xizeng Shi, Union City; Arthur Hungshin Tao, Saratoga, all of Calif.

[73] Assignee: Headway Technologies, Inc., Milpitas, Calif.

[21] Appl. No.: 682,476

[22] Filed: Jul. 17, 1996

[51] Int. Cl.$^6$ .............................. G11B 5/127; G11B 5/187
[52] U.S. Cl. ................................................. 360/113; 360/122
[58] Field of Search .................................... 360/122, 113

[56] References Cited

U.S. PATENT DOCUMENTS

| | | | |
|---|---|---|---|
| 5,075,956 | 12/1991 | Das | 29/603 |
| 5,193,039 | 3/1993 | Smith et al. | 360/113 |
| 5,229,904 | 7/1993 | Iyo et al. | 360/122 |
| 5,452,164 | 9/1995 | Cole et al. | 360/113 |
| 5,479,696 | 1/1996 | McNeil | 360/113 |
| 5,495,378 | 2/1996 | Bonyhard et al. | 360/113 |
| 5,532,892 | 7/1996 | Nix et al. | 360/113 |

*Primary Examiner*—John H. Wolff
*Attorney, Agent, or Firm*—George O. Saile; Stephen B. Ackerman; Alek P. Szecsy

[57] ABSTRACT

A low fringe-field and narrow write-track magnetic read-write head. The low fringe-field and narrow write-track magnetic read-write head includes a first pole layer formed adjoining an insulator layer over a substrate. The first pole layer has a first air bearing surface which has a first edge adjoining and parallel with a first surface of the insulator layer. The low fringe-field and narrow write-track magnetic read-write head also includes a second pole layer separated from the first pole layer by the insulator layer. The second pole layer has a width no greater than about 20 microns and a width no greater than about 100 percent of the width of the first pole layer where the width of the second pole layer is contained within the width of the first pole layer. The second pole layer also has a second air bearing surface coplanar with the first air bearing surface. The second air bearing surface has a second edge adjoining and parallel with a second surface of the insulator layer parallel and opposite from the first surface of the insulator layer. Finally, there is removed at least one portion of at least one of: (1) the second air bearing surface including at least one outer portion of the second edge; and (2) the first air bearing surface including at least one portion of the first edge most closely adjoining but not opposite the second edge.

20 Claims, 3 Drawing Sheets

LOW FRINGE-FIELD AND NARROW WRITE-TRACK MAGNETO-RESISTIVE (MR) MAGNETIC READ-WRITE HEAD

BACKGROUND OF THE INVENTION

1. Field of the Invention

The present invention relates generally to magnetic read-write heads employed in magnetic data recording and retrieval. More particularly, the present invention relates to a low fringe-field and narrow write-track magnetic read-write head employed in Direct Access Storage Device (DASD) magnetic data recording and retrieval.

2. Description of the Related Art

The recent and continuing advances in computer and information technology have been made possible not only by the correlating advances in the functionality, reliability and speed of semiconductor integrated circuits, but also by the correlating advances in storage density of Direct Access Storage Devices (DASDs) employed in magnetic data storage and retrieval. Storage density of Direct Access Storage Devices (DASDs) is typically measured as areal storage density of a magnetic storage medium formed upon a rotating magnetic data storage disk within a Direct Access Storage Device (DASD) enclosure. The areal storage density is defined largely by the track width, the track spacing and the linear magnetic domain density within the magnetic storage medium. The track width, the track spacing and the linear magnetic domain density are in turn determined by several principal factors, including but not limited to: (1) the magnetic read-write characteristics of a magnetic read-write head employed in reading and writing magnetic data into and from the magnetic storage medium; (2) the magnetic domain characteristics of the magnetic storage medium which is formed upon the rotating magnetic data storage disk; and (3) the separation distance of the magnetic read-write head from the rotating magnetic data storage disk.

With regard to the magnetic read-write characteristics of the magnetic read-write heads employed in reading and writing magnetic data into and from the magnetic storage medium, it is known in the art that several characteristics of those magnetic read-write heads affect the areal storage density of magnetic data achievable within the magnetic storage medium. In particular, it is known in the art that the track-width within a magnetic storage medium formed upon a rotating magnetic data storage disk is typically directly related to the width of the inductive magnetic transducer pole or poles typically employed in writing the magnetic data into the magnetic storage medium. In addition, it is also commonly known in the art that the magnetic fringe-field intensity at locations adjoining the edges of an inductive magnetic transducer pole or poles will typically directly influence the track spacing within a magnetic storage medium. Thus, it is desirable in the art of Direct Access Storage Device (DASD) design and fabrication to employ magnetic read-write heads with narrow inductive magnetic transducer poles and limited fringe-fields through which may be written data tracks of narrow width and narrow spacing. It is towards that goal that the present invention is generally directed.

In order to provide magnetic read-write heads of dimension sufficiently small to address the areal magnetic data storage requirements of advanced Direct Access Storage Devices (DASDs), it is common to employ advanced photolithographic methods in the fabrication of those magnetic read-write heads. While the most advanced photolithographic methods provide both the line-width and registration tolerance needed for fabricating magnetic read-write heads with narrow inductive transducer poles and limited fringe-fields, the most advanced photolithographic methods also provide substantial expense when employed to provide both the narrow line-widths and registration tolerances over the substantial distances typically required in forming advanced magnetic read-write heads. It is thus also towards the goal of forming advanced magnetic read-write heads having narrow inductive magnetic transducer poles and low fringe-fields without the need for employing the most advanced photolithographic fabrication tooling and methods that the present invention is specifically directed.

Methods and materials through which the fabrication process for magnetic read-write heads may be modified to provide desirable characteristics within those magnetic read-write heads are known in the art. For example, Das in U.S. Pat. No. 5,075,956 discloses a method for fabricating a magnetic read-write head with side shields which provide 360 degree shielding against sensing by the magnetic read-write head of magnetic flux other than that of a target source. In addition, Smith et al. in U.S. Pat. No. 5,193,039 disclose a Magneto-Resistive (MR) magnetic read-write head employing an easy axis bias element for the Magneto-Resistive (MR) sensor formed simultaneously with the contact pads for the Magneto-Resistive (MR) sensor. Finally, Bonyhard et al. in U.S. Pat. No. 5,495,378 disclose for use within a Magneto-Resistive (MR) magnetic read-write head a Magneto-Resistive (MR) sensor with improved performance and processability. The Magneto-Resistive (MR) sensor employs a soft adjacent magnetic layer formed above the Magneto-Resistive (MR) sensor.

Desirable in the art are additional methods and materials through which the fabrication of magnetic read-write heads may be modified to provide magnetic read-write heads with desirable characteristics. Particularly desirable are methods and materials through which may be formed magnetic read-write heads having low fringe-fields and narrow write-tracks while simultaneously being readily fabricated through methods which do not employ the most advanced photolithographic fabrication tooling and methods.

SUMMARY OF THE INVENTION

A first object of the present invention is to provide a low fringe-field and narrow write-track magnetic read-write head.

A second object of the present invention is to provide a low fringe-field and narrow write-track magnetic read-write head which may be fabricated without employing the most advanced photolithographic fabrication tooling and methods.

A third object of the present invention is to provide a low fringe-field and narrow write-track magnetic read-write head which is readily manufacturable.

In accord with the objects of the present invention, there is provided by the present invention a low fringe-field and narrow write-track magnetic read-write head. The low fringe-field and narrow write-track magnetic read-write head comprises a first pole layer formed adjoining an insulator layer over a substrate. The first pole layer has a first air bearing surface which has a first edge adjoining and parallel with a first surface of the insulator layer. The low fringe-field and narrow write-track magnetic read-write head also comprises a second pole layer separated from the first pole layer by the insulator layer. The second pole layer has a width no greater than about 20 microns, which width is also no greater than about 100 percent of the width of the first pole layer. In addition, the width of the second pole layer is contained within the width of the first pole layer. The second pole layer also has a second air bearing surface coplanar with the first air bearing surface. The second air bearing surface has a second edge adjoining and parallel with a second surface of the insulator layer parallel and opposite from the first surface of the insulator layer. Finally, there is removed at least one portion of at least one of: (1) the second air bearing surface including at least one outer portion of the second edge; and (2) the first air bearing surface including at least one portion of the first edge most closely adjoining but not opposite the second edge.

The present invention provides a low fringe-field and narrow write-track magnetic read-write head which may be fabricated without employing the most advanced photolithographic fabrication tooling and methods. There is provided through the present invention a low fringe-field and narrow write-track magnetic read-write head employing a second pole layer having a width of no greater than about 20 microns, which width is also no greater than about 100 percent of the width of a first pole layer which is separated from the second pole layer by an insulator layer, where the width of the second pole layer is contained within the width of the first pole layer. In addition, the first pole layer has a first air bearing surface and the second pole layer has a coplanar second air bearing surface, where the first air bearing surface and the second air bearing surface are also separated by the insulator layer. By selectively removing at least one portion of at least one of: (1) the second air bearing surface including at least one outer portion of the second edge; and (2) the first air bearing surface including at least one portion of the first edge most closely adjacent to but not opposite the second edge, there may be formed a low fringe-field and narrow write-track magnetic read-write head without employing the most advanced photolithographic tooling and methods. The volume of material to be removed from the first air bearing surface and/or the second air bearing surface in forming the low fringe-field and narrow write-track magnetic read-write head of the present invention is sufficiently small such it may be removed through direct etch methods other than methods employing the most advanced photolithographic tooling and methods. In addition, due to the asymmetry in the width of the first pole layer and the second pole layer there is also inherently avoided a need for the most advanced photolithography tooling and methods to assure proper registration of the second pole layer with respect to the first pole layer.

The low fringe-field and narrow write-track magnetic read-write head of the present invention is readily manufacturable. The methods and materials through which are formed the first pole layer, the second pole layer and the insulator layer within the low fringe-field and narrow write-track magnetic read-write head of the present invention are known in the art. It is at least in part the relative sizing and locations of those layers that allows the low fringe-field and narrow write-track magnetic read-write head to be fabricated without employing the most advanced photolithographic fabrication tooling and methods. Thus, the low fringe-field and narrow write-track magnetic read-write head of the present invention is readily manufacturable.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENTS

The present invention provides a low fringe-field and narrow write-track magnetic read-write head which may be employed in magnetic data storage and retrieval from a magnetic data storage medium formed upon a rotating magnetic data storage disk within a Direct Access Storage Device (DASD) magnetic data storage enclosure. The low fringe-field and narrow write-track magnetic read-write head of the present invention may be fabricated without employing the most advanced photolithographic tooling and methods.

The low fringe-field and narrow write-track magnetic read-write head of the present invention employs a second pole layer of a width less than about 20 microns, which second pole layer also has a width less than about 100 percent of the width of a first pole layer separated from the second pole layer by an insulator layer, where the width of the second pole layer is contained within the width of first pole layer. The first pole layer also has a first air bearing surface coplanar with and separated from a second air bearing surface of the second pole layer by the insulator layer.

Although the low fringe-field and narrow write-track magnetic read-write head of the present invention will typically be employed in reading and writing magnetic data into and from a magnetic data storage medium formed upon a rotating magnetic data storage disk within a Direct Access Storage Device (DASD), the low fringe-field and narrow write-track magnetic read-write head of the present invention may be employed whenever there is needed a magnetic read-write head exhibiting a low fringe-field and a narrow write track. In addition, although the preferred embodiments of the low fringe-field and narrow write-track magnetic read-write head of the present invention are formed employing a shared pole magnetic read-write head, the low fringe-field and narrow write-track magnetic read-write head of the present invention may also be formed within any magnetic read-write head having a minimum of two inductive magnetic transducer poles of geometry as disclosed above and claimed below.

Figure 1:
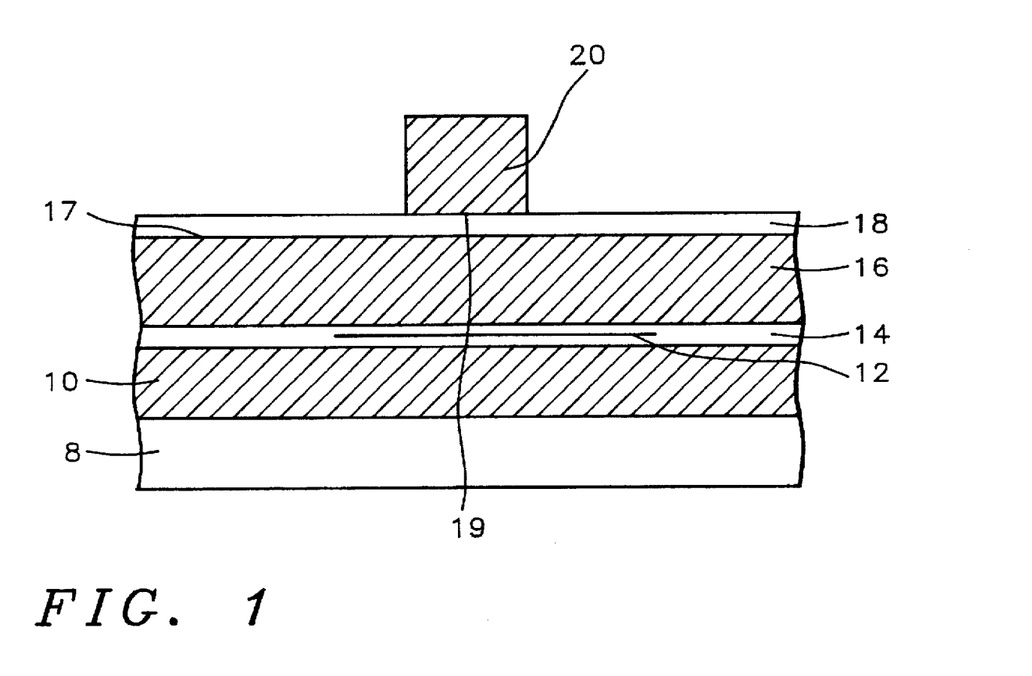
FIG. 1 shows a schematic plan-view diagram illustrating the air bearing surface (ABS) of a shared pole magnetic read-write head formed in accord with the present invention prior to removal of any portion of either the first air bearing surface of the first pole layer or the second air bearing surface of the second pole layer.

Referring now to FIG. 1, there is shown a schematic plan-view diagram of the air bearing surface (ABS) of a shared pole magnetic read-write head formed in accord with the present invention prior to removing from the air bearing surface (ABS) portions of a first pole layer and/or a second pole layer to form a low fringe-field and narrow write-track magnetic read-write head in accord with the preferred embodiments of the present invention.

Shown in FIG. 1 is a third pole layer 10 separated from a first pole layer 16 by a second insulator layer 14. Disposed within the second insulator layer 14 is a substrate 8 having formed thereover a Magneto-Resistive (MR) sensor layer 12. The third pole layer 10, the second insulator layer 14 and the Magneto-Resistive (MR) sensor layer 12 may be formed through methods and materials as are conventional in the art of forming those types of layers within magnetic read-write heads. The substrate 8 is preferably a slider employed in positioning a magnetic read-write head comprising the third pole layer 10, the first pole layer 16 and the second insulator layer 14 over a magnetic data storage medium formed upon a rotating magnetic data storage disk within a Direct Access Storage Device (DASD) magnetic data storage enclosure.

For example, methods and materials through which pole layers may be formed within magnetic read-write heads include but are not limited to plating methods, Chemical Vapor Deposition (CVD) methods, Plasma Enhanced Chemical Vapor Deposition (PECVD) methods and Physical Vapor Deposition (PVD) sputtering methods through which may be formed pole layers of soft magnetic materials including but not limited to of nickel-iron (Ni-Fe) alloys, iron-aluminum-silicon (Fe-Al-Si) alloys, cobalt (Co) base alloys and composites of nickel-iron (Ni-Fe) alloys, iron-aluminum-silicon (Fe-Al-Si) alloys and cobalt (Co) base alloys. Similarly, insulator layers may be formed within magnetic read-write heads through methods and materials including but not limited to Chemical Vapor Deposition (CVD) methods, Plasma Enhanced Chemical Vapor Deposition (PECVD) methods, reactive sputtering methods and Physical Vapor Deposition (PVD) sputtering methods through which may be formed insulator layers of insulator materials including but not limited to aluminum oxide insulator materials, silicon oxide insulator materials, silicon nitride insulator materials and silicon oxynitride insulator materials. Finally, Magneto-Resistive (MR) sensor layers are typically, although not exclusively, formed within magnetic read-write heads through Physical Vapor Deposition (PVD) sputtering methods through which are formed Magneto-Resistive (MR) sensor layers of Magneto-Resistive (MR) materials typically, although not exclusively, formed of a Permalloy (ie: iron-nickel (Fe-Ni)) alloy.

For the preferred embodiments of the present invention, the third pole layer 10 is preferably formed of a soft magnetic material chosen from the group of soft magnetic materials consisting of nickel-iron (Ni-Fe) alloys, iron-aluminum-silicon (Fe-Al-Si) alloys, cobalt (Co) base alloys and composites of nickel-iron (Ni-Fe) alloys, iron-aluminum-silicon (Fe-Al-Si) alloys and cobalt (Co) base alloys, typically although not exclusively deposited through a Physical Vapor Deposition (PVD) sputtering method to form a third pole layer 10 of a thickness from about 0.5 to about 5.0 microns. Similarly, for the preferred embodiments of the present invention, the second insulator layer 14 is preferably formed of an insulator material such as but not limited to aluminum oxide deposited adjoining the third pole layer 10 through a Plasma Enhanced Chemical Vapor Deposition (PECVD) method to form a second insulator layer 14 of thickness about 0.01 to about 1 microns. Finally, for the preferred embodiments of the present invention, the Magneto-Resistive (MR) sensor layer 12 is preferably formed at least in part of a Permalloy Magneto-Resistive (MR) material formed within the second insulator layer 14 through a Physical Vapor Deposition (PVD) sputtering method to form a Permalloy Magneto-Resistive (MR) sensor layer 12 of thickness about 0.02 to about 0.05 microns. The Magneto-Resistive (MR) sensor layer 12 may alternatively be provided in any of several other geometric forms as are known in the art, including but not limited to dual-stripe Magneto-Resistive (MR) sensor layer geometric forms and giant Magneto-Resistive (MR) sensor layer geometric forms.

As is illustrated by the schematic plan-view diagram of FIG. 1, the third pole layer 10 will typically be the layer within the magnetic read-write head whose schematic plan-view diagram is illustrated by FIG. 1 which is typically formed most closely to the rear surface of a slider employed in positioning the magnetic read-write head over a magnetic data storage medium formed upon a rotating magnetic data storage disk within a Direct Access Storage Device (DASD) magnetic data storage enclosure. An alternative position for the third pole layer 10 is not, however, excluded. Similarly, as is understood by a person skilled in the art, the presence and location of the Magneto-Resistive (MR) sensor layer 12, as well as the presence and location of various other layers which are common in the art of magnetic read-write head fabrication but excluded from the magnetic read-write head whose schematic plan-view diagram is illustrated in FIG. 1 may also be present or absent at locations within the magnetic read-write head whose schematic plan-view diagram is illustrated in FIG. 1 where they would typically be formed. Such other layers include but are not limited to shield layers, coil layers, passivation layers, conductive connection/interconnection layers, resin layers, overcoating layers and termination layers.

Also shown in FIG. 1 is a first air bearing surface formed from a first pole layer 16. The first air bearing surface formed from the first pole layer 16 has a first edge 17. The first air bearing surface formed from the first pole layer 16 is also separated from a second air bearing surface formed from a second pole layer 20 by an insulator layer 18. The second air bearing surface formed from the second pole layer 20 has a second edge 19. The first air bearing surface, the first edge 17, the second air bearing surface and the second edge 19 are preferably coplanar. It is at least one portion of at least either: (1) the first pole layer 16 including at least one portion of the first edge 17 most closely adjacent but not opposite to the second edge 19; or (2) or the second pole layer 20 including at least one outer portion of the second edge 19, which is selectively removed to provide from the shared pole magnetic read-write head whose schematic plan-view diagram is illustrated in FIG. 1 the low-fringe field and narrow write-track magnetic read-write heads of the preferred embodiments of the present invention. The first pole layer 16 and the second pole layer 20 may be formed through methods and materials analogous to the methods and materials employed in forming the third pole layer 10. Preferably, the first pole layer 16 and the second pole layer 20 are formed through methods and materials equivalent to the methods and materials employed in forming the third pole layer 10. Preferably, the first pole layer 16 is from about 0.5 to about 5.0 microns thick and the second pole layer 20 is from about 0.5 to about 5.0 microns thick.

Similarly, the insulator layer 18 may be formed through methods and materials analogous to the methods and materials employed in forming the second insulator layer 14. Preferably, the insulator layer 18 is formed through methods and materials equivalent to the methods and materials employed in forming the second insulator layer 14. Preferably, the insulator layer 18 is from about 0.05 to about 1 microns thick.

Although the first pole layer 16 and the second pole layer 20 are preferably formed through equivalent methods, materials and thickness dimensions, the first pole layer 16 and the second pole layer 20 preferably have significantly different widths. In order to provide the low fringe-field and narrow write-track magnetic read-write heads of the preferred embodiments of the present invention, the width of the second pole layer 20 is preferably no greater than about 20 microns. In addition, to avoid any magnetic field inhomogeneities which might otherwise occur due to mis-registration of the second pole layer 20 with respect to the first pole layer 16, the width of the second pole layer 20 is preferably no greater than about 100 percent of the width of the first pole layer while the width of the second pole layer 20 is contained within the width of the first pole layer 16. Most preferably, the width of the second pole layer 20 is from about 0.1 to about 100 percent of the width of the first pole layer 16 and the width of the second pole layer 20 is substantially centered within the width of the first pole layer 16.

Figure 2:
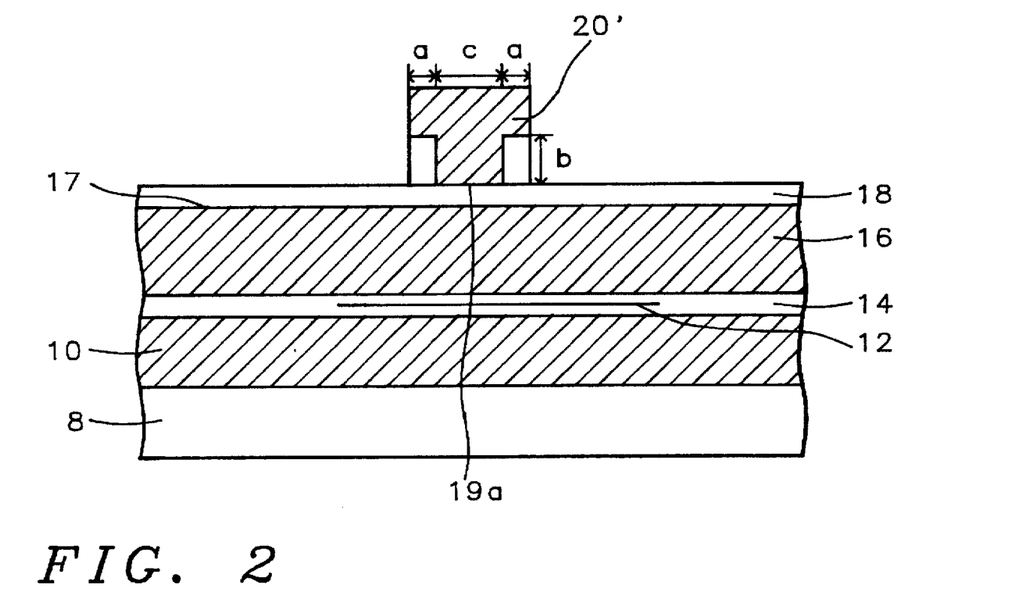
FIG. 2 to FIG. 5 show a series of schematic plan-view diagrams illustrating the air bearing surfaces (ABSs) of four different magnetic read-write heads formed in accord with four preferred embodiments of the present invention where multiple sections of the first air bearing surface of the first pole layer and/or the second air bearing surface of the second pole layer have been removed.

Referring now to FIG. 2 to FIG. 5 there is shown a series of four schematic plan-view diagrams corresponding with the air bearing surfaces (ABSs) of a series of four preferred embodiments of the low fringe-field and narrow write-track magnetic read-write head of the present invention. The four preferred embodiments of the low fringe-field and narrow write-track magnetic read-write head are formed through selectively removing portions of the air bearing surfaces of the first pole layer 16 and/or the second pole layer 20. Although the method of the present invention will also provide a low fringe-field and narrow write-track magnetic read-write head through removal of a single portion of the air bearing surface of either the first pole layer 16 or the second pole layer 20, it is preferred within the present invention that pairs of the air bearing surfaces of the first pole layer 16 and/or the second pole layer 20 be removed. Shown in FIG. 2 is a schematic plan-view diagram of the air bearing surface (ABS) of a low fringe-field and narrow write-track magnetic read-write head formed in accord with the first preferred embodiment of the present invention.

Shown in FIG. 2 is a schematic plan-view diagram illustrating the results of selectively removing two opposite portions of the second pole layer 20 including two potions of the second edge 19 to form an etched second pole layer 20' having a remaining second edge 19a opposite the insulator layer 18 from the first edge 17. The remaining second edge 19a has a width "c" preferably from about 0.1 to about 4 microns, while each of the two portions removed from the etched second pole layer 20' has: (1) a width "a" preferably from about 0.1 to about 2 microns adjoining the remaining second edge 19a; (2) a length "b" preferably from about 0.1 to about 4 microns perpendicular to the remaining second edge 19a; and (3) (not shown in FIG. 2) a depth of from about 0.1 to about 5 microns into the etched second pole layer 20'.

Figure 3:
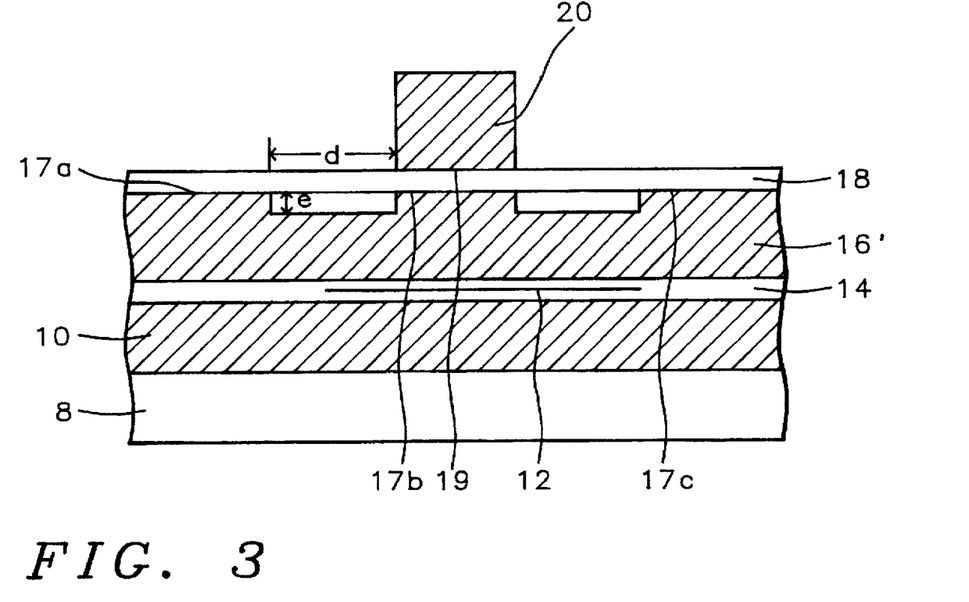

Referring now to FIG. 3, there is shown a schematic plan-view diagram of the air bearing surface (ABS) of a low fringe-field and narrow write-track magnetic read-write head formed in accord with a second preferred embodiment of the present invention. Shown in FIG. 3 is the air bearing surface of a shared pole magnetic read-write head analogous to the air bearing surface of the shared pole magnetic read-write head shown in FIG. 1, but from whose first pole layer 16 have been removed two portions including two portions of the first edge 17 most closely adjacent to but not opposite from the second edge 19 to leave the remaining first edges 17a, 17b and 17c and the etched first pole layer 16'. As illustrated in FIG. 3, the remaining first edge 17b is preferably of width equivalent to the second edge 19. Each of the two portions removed from the etched first pole layer 16' preferably has: (1) a width "d" from about 0.1 to about 10 microns separating either the remaining first edge 17a or the remaining first edge 17c from the remaining first edge 17b; (2) a length "e" from about 0.1 to about 2 microns perpendicular to the remaining first edge 17b; and (3) (not shown in FIG. 3) a depth of from about 0.1 to about 5 microns into the etched first pole layer 16'.

Figure 4:
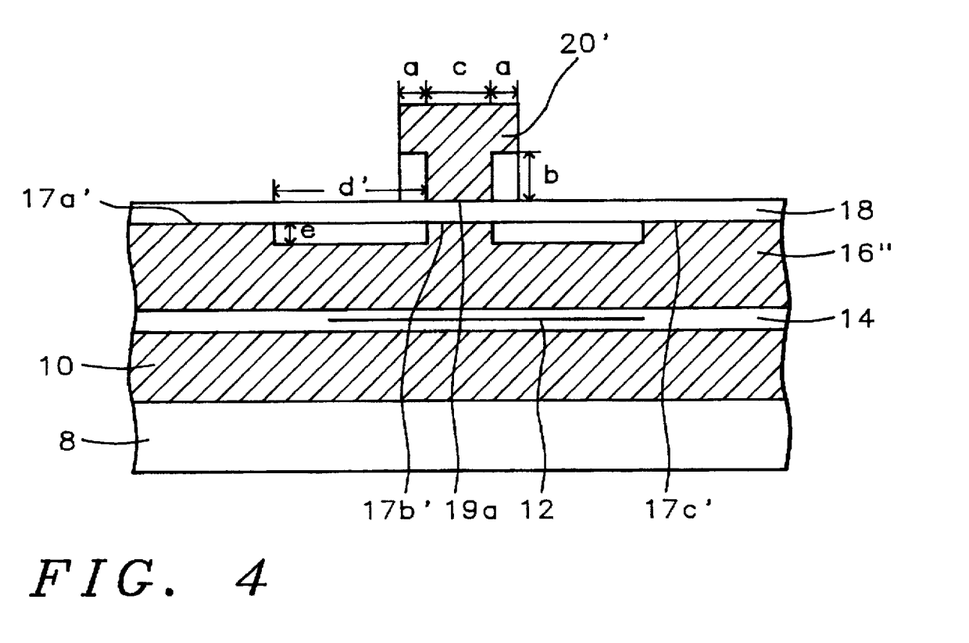

Referring now to FIG. 4 there is shown a schematic plan-view diagram illustrating the air bearing surface (ABS) of a low fringe-field and narrow write-track magnetic read-write head formed in accord with a third preferred embodiment of the present invention. Shown within FIG. 4 is a schematic plan-view diagram of the air bearing surface of a shared pole magnetic read-write head otherwise equivalent to the air bearing surface of the shared pole magnetic read-write head illustrated in FIG. 1, but from each of whose first pole layer 16 and second pole layer 20 have been removed two portions. The two portions removed from the second pole layer 20 preferably form an etched second pole layer 20' of dimensions equivalent to the etched second pole layer 20' disclosed as the first preferred embodiment of the low fringe-field and narrow write-track magnetic read-write head of the present invention corresponding with FIG. 2. The two portions removed from the first pole layer 16 preferably form an etched first pole layer 16" of dimensions otherwise equivalent to the etched first pole layer 16' disclosed as the second preferred embodiment of the low fringe-field and narrow write-track magnetic read-write head of the present invention corresponding with FIG. 3 with the exception that the remaining first edge 17b' is shorter than the remaining first edge 17b and the remaining first edges 17a' and 17c' are longer than the remaining first edges 17a and 17c. The dimension "d'" within FIG. 4 is preferably of a range equivalent to the range for the dimension "d" within FIG. 3.

Figure 5:
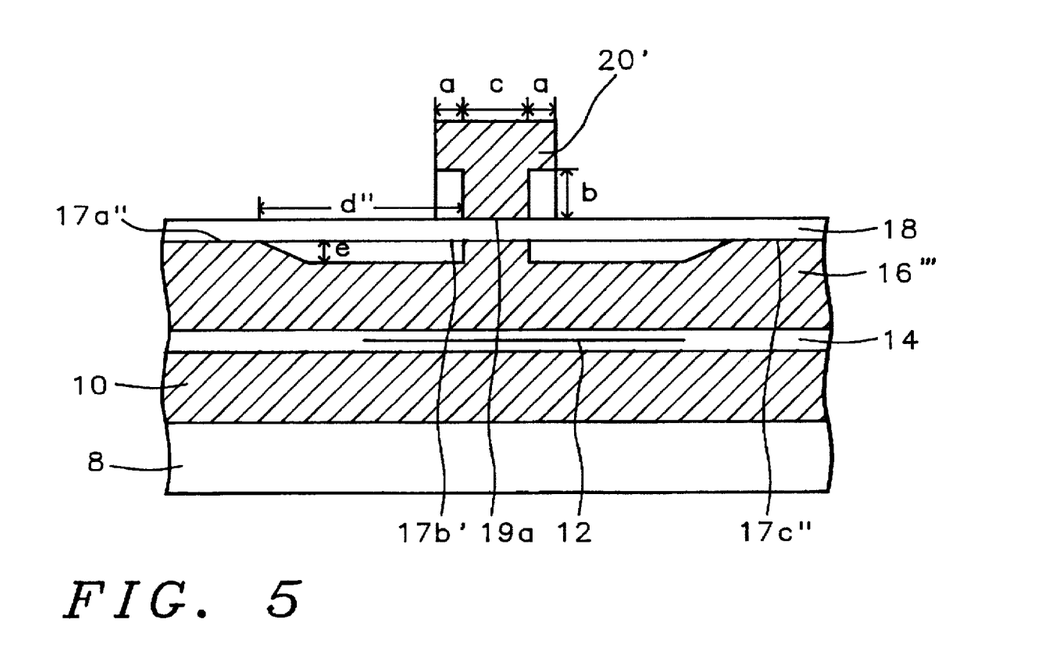

Referring now to FIG. 5, there is shown a schematic plan-view diagram illustrating the air bearing surface (ABS) of a low fringe-field and narrow write-track magnetic read-write head formed in accord with a fourth preferred embodiment of the present invention. Shown in FIG. 5 is a schematic plan-view diagram of a low fringe-field and narrow write-track magnetic read-write head otherwise equivalent to the schematic plan-view diagram of the low fringe-field and narrow write-track magnetic read-write head the schematic plan-view diagram of whose air bearing surface (ABS) is shown in FIG. 4 with the exception that opposite ends of the two portions of the etched first pole layer 16" which have been removed have also been tapered to form a tapered etched first pole layer 16'" exhibiting a more smoothly flowing contour to a remaining first edge 17a" and a remaining first edge 17c". Through this tapering there is formed the tapered etched first pole layer 16'" which is more likely to provide a low fringe-field and narrow write track magnetic read-write head which is less susceptible to noise which would otherwise be induced at sharp edges within the etched first pole layer 16" as illustrated in FIG. 4. The dimension "d''" within FIG. 5 is preferably of a range equivalent to the range for the dimension "d'" within FIG. 4.

Methods and materials through which portions of the first air bearing surface of first pole layer 16 and/or the second air bearing surface of the second pole layer 20 within the schematic plan-view diagram of the air bearing surface (ABS) of the shared pole magnetic read-write head as illustrated in FIG. 1 may be etched to form the etched first pole layers 16', 16" and 16'" as illustrated in FIG. 3, FIG. 4 and FIG. 5 and the etched second pole layer 20' as illustrated in FIG. 2, FIG. 4 and FIG. 5 are known in the art of magnetic read-write head fabrication. Portions of the first pole layer 16 and the second pole layer 20 may be etched to form the etched first pole layers 16', 16" and 16'" and the etched second pole layer 20' through methods including but not limited to masked broadened ion beam etch methods, maskless focused ion-beam etch methods and maskless laser beam etch methods. Such maskless focused ion-beam etch methods and maskless laser beam etch methods may be undertaken with or without gas-assisted or chemical-assisted methods as are also known in the art.

Upon forming a low fringe-field and narrow write-track magnetic read-write head in accord with the low fringe-field and narrow write-track magnetic read-write head of the first preferred embodiment, the second preferred embodiment, the third preferred embodiment or the fourth preferred embodiment of the low fringe-field and narrow write-track magnetic read-write head of the present invention, there is formed a low fringe-field and narrow write-track magnetic read-write head without employing the most advanced photolithographic tooling and methods.

EXAMPLES

Two shared pole magnetic read-write heads were fabricated in accord with the shared pole magnetic read-write head the schematic plan-view diagram of whose air bearing surface (ABS) is illustrated in FIG. 1. Each of the shared pole magnetic read-write heads had a first pole layer formed of a nickel-iron (Ni-Fe) magnetic material deposited through a plating method at a thickness of about 3 microns and a width of about 70 microns. The first pole layer was separated from a second pole layer by an insulator layer formed of aluminum oxide deposited through a reactive sputtering method at a thickness of about 0.3 microns. The second pole layer was also formed of a nickel-iron (Ni-Fe) magnetic material deposited through a plating method, but at a thickness of about 3.5 microns. In addition, the second pole layer had a width of about 3.6 microns where the width of the second pole layer was approximately centered within the width of the first pole layer.

The two shared pole magnetic read-write heads each also had a third pole layer formed on the opposite side of the first pole layer from the second pole layer. In contrast to the first pole layer and the second pole layer, the third pole layer was formed of a cobalt-niobium-hafnium (Co-Nb-Hf) magnetic material deposited through a Physical Vapor Deposition (PVD) sputtering method at a thickness of about 2 microns and a width of about 150 microns. The third pole layer was separated from the first pole layer by a second insulator layer formed of aluminum oxide deposited through a reactive sputtering method of three separate aluminum oxide coatings at successive coating thicknesses of 900, 500 and 900 angstroms. The second insulator layer had disposed therein a dual-stripe Magneto-Resistive (MR) sensor layer formed from a Permalloy (iron-nickel) Magneto-Resistive (MR) material deposited through a Physical Vapor Deposition (PVD) sputtering method at a thickness of about 0.025 microns.

Portions of the air bearing surfaces of the first pole layer and the second pole layer upon one of the shared pole magnetic read-write heads were then removed to form a low fringe-field and narrow write-track magnetic read-write head in accord with the third preferred embodiment of the low fringe-field and narrow write-track magnetic read-write head of the present invention as illustrated in FIG. 4. The low fringe-field and narrow write-track magnetic read-write head so formed had removed two portions from the second air bearing surface of its second pole layer to leave a remaining second edge of width "c" about 1.8 microns. The dimensions of each of the two removed portions of the second air bearing surface included: (1) a width "a" of about 0.9 microns adjoining the remaining second edge; (2) a length "b" of about 0.6 microns perpendicular to the remaining second edge; and (3) (not illustrated in FIG. 4) a depth into the second pole layer of about 1 microns. The low fringe-field and narrow write-track magnetic read-write head also had two portions removed from the first air bearing surface of its first pole layer to leave a remaining first edge also of width "c" about 1.8 microns centered beneath the remaining second edge. The dimensions of the two removed portions of the first air bearing surface included: (1) a width "d'" of about 6 microns adjoining the remaining first edge centered beneath the remaining second edge; (2) a length "e" of about 0.6 microns perpendicular to the remaining first edge centered beneath the remaining second edge; and (3) (not shown in FIG. 4) a depth of about 1 microns into the first pole layer. The remaining shared pole magnetic read-write head received no further processing.

The two magnetic read-write heads were then fabricated into slider assemblies through methods as are conventional in the art and subsequently assembled into a test apparatus through which was measured the erase band width of the individual magnetic read-write heads, also employing methods as are conventional in the art. The results of the erase band width measurements are reported in TABLE I.

TABLE I

| Example | Process Conditions | Erase Band Width |
|---|---|---|
| 1 | Untrimmed poles | 2.0 microns |
| 2 | Trimmed poles | 1.0–1.2 |

From review of the data in TABLE I, it is seen that a low fringe-field and narrow write track magnetic read-write head fabricated in accord with the third preferred embodiment of the low fringe-field and narrow write-track magnetic read-write head of the present invention exhibits a substantial reduction in erase band width in comparison with an otherwise equivalent shared pole magnetic read-write head absent removal of portions of the first air bearing surface of the first pole layer and the second air bearing surface of the second pole layer.

As is understood by a person skilled in the art, the low fringe-field and narrow write-track magnetic read-write head of the preferred embodiments and examples of the present invention are illustrative of the low fringe-field and narrow write-track magnetic read-write head of the present invention rather than limiting of the low fringe-field and narrow write-track magnetic read-write head of the present invention. Revisions may be made to methods, materials, structures and dimensions through which is provided the low fringe-field and narrow write-track magnetic read-write head of the preferred embodiments and examples of the present invention while still providing a low fringe-field and narrow write-track magnetic read-write head encompassed by the spirit and scope of the present invention, as defined by the accompanying claims.

What is claimed is:

1. A low fringe-field and narrow write-track magnetic read-write head comprising:

a substrate;

a first pole layer formed over the substrate, the first pole layer having a first width and the first pole layer having a first air bearing surface;

an insulator layer formed upon the first pole layer, the insulator layer being a gap filing insulator layer; and a second pole layer formed upon the insulator layer, the second pole layer having a second width contained within the first width of the first pole layer, the second pole layer having a second air bearing surface coplanar with the first air bearing surface of the first pole layer, the first air bearing surface and the second air bearing surface being separated by the insulator layer, the first pole layer having a first edge contiguous with the first air bearing surface of the first pole layer at the interface of the first pole layer with the insulator layer, the second pole layer having a second edge contiguous with the second air bearing surface of the second pole layer at the interface of the second pole layer with the insulator layer, where there is formed into at least one of the first pole layer and the second pole layer at least one aperture, the aperture(s) being formed within at least one of:

the second air bearing surface including at least one outermost portion of the second edge: and the first air bearing surface including at least one portion of the first edge most closely adjacent but not opposite the second edge.

2. The magnetic read-write head of claim 1 wherein:

the first pole layer is from about 0.5 to about 5 microns thick and the second pole layer is from about 0.5 to about 5 microns thick; and the first pole layer and the second pole layer are formed from a soft magnetic material chosen from the group of soft magnetic materials consisting of nickel-iron (Ni-Fe) alloys, iron-aluminum-silicon (Fe-Al-Si) alloys, cobalt (Co) base alloys and composites of nickel-iron (Ni-Fe) alloys, iron-aluminum-silicon (Fe-Al-Si) alloys and cobalt (Co) base alloys.

3. The magnetic read-write head of claim 1 wherein:

the insulator layer is formed to a thickness of about 0.5 to about 1 microns; and the insulator layer is formed of an insulator material chosen from the group of insulator materials consisting of aluminum oxide insulator materials, silicon oxide insulator materials, silicon nitride insulator materials and silicon oxynitride insulator materials.

4. The magnetic read-write head of claim 1 wherein two apertures are formed within the second air bearing surface to leave a remaining second edge centered along the second air bearing surface wherein:

the remaining second edge is from about 0.1 to about 4.0 microns in width; and the two apertures formed within the second air bearing surface each have a width adjoining the remaining second edge of from about 0.1 to about 2.0 microns, a length perpendicular to the remaining second edge of about 0.1 to about 4.0 microns and a depth into second pole layer of from about 0.1 to about 5.0 microns.

5. The magnetic read-write head of claim 1 wherein two apertures are formed within the first air bearing surface to leave a remaining first edge of width equal to the second edge centered opposite the second edge wherein:

the remaining first edge is from about 0.1 to about 4.0 microns in width; and the two apertures formed within the first air bearing surface each have a width adjoining the remaining first edge of from about 0.1 to about 10 microns, a length perpendicular to the remaining first edge of from about 0.1 to about 2.0 microns and a depth into the first pole layer of from about 0.1 to about 5.0 microns.

6. The magnetic read-write head of claim 5 wherein each of the two apertures formed within the first air bearing surface has a taper in the aperture at a location within the aperture furthest spaced from the second edge.

7. The magnetic read-write head of claim 1 wherein two apertures are formed within the first air bearing surface and two apertures are formed within the second air bearing surface to form a remaining second edge centered along the second air bearing surface and a remaining first edge of width equivalent to the remaining second edge centered opposite the remaining second edge wherein:

the remaining second edge is from about 0.1 to about 4.0 microns in width;

the two apertures formed within the second air bearing surface each have a width adjoining the remaining second edge of from about 0.1 to about 2.0 microns, a length perpendicular to the remaining second edge of from about 0.1 to about 4.0 microns and a depth into second pole layer of from about 0.1 to about 5.0 microns;

the remaining first edge is from about 0.1 to about 4.0 microns in width; and the two apertures formed within the first air bearing surface each have a width adjoining the remaining first edge of from about 0.1 to about 10 microns, a length perpendicular to the remaining first edge of from about 0.1 to about 2.0 microns and a depth into the first pole layer of from about 0.1 to about 5.0 microns.

8. The magnetic read-write head of claim 7 wherein each of the two apertures formed within the first air bearing surface has a taper in the aperture at a location within the aperture furthest spaced from the remaining second edge.

9. The magnetic read-write head of claim 1 further comprising a third pole layer separated from the side of the first pole layer opposite the second pole layer by a second insulator layer, the second insulator layer having disposed therein a Magneto-Resistive (MR) sensor layer.

10. A method for forming a low fringe-field and narrow write-track magnetic read-write head comprising:

providing a substrate;

forming over the substrate a first pole layer, the first pole layer having a first width and the first pole layer having a first air bearing surface;

forming an insulator layer upon the first pole layer, the insulator layer being a gap filing insulator layer;

forming a second pole layer upon the insulator layer, the second pole layer having a second width contained within the first width of the first pole layer, the second pole layer having a second air bearing surface coplanar with the first air bearing surface of the first pole layer, the first air bearing surface and the second air bearing surface being separated by the insulator layer, the first pole layer having a first edge contiguous with the first air bearing surface of the first pole layer at the interface of the first pole layer with the insulator layer, the second pole layer having a second edge contiguous with the second air bearing surface of the second pole layer at the interface of the second pole layer with the insulator layer, and forming into at least one of the first pole layer and the second pole layer at least one aperture, the aperture(s) being formed within at least one of;

the second air bearing surface including at least one outermost portion of the second edge: and the first air bearing surface including at least one portion of the first edge most closely adjacent but not opposite the second edge.

11. The method of claim 10 wherein:

the first pole layer is from about 0.5 to about 5 microns thick and the second pole layer is from about 0.5 to about 5 microns thick; and the first pole layer and the second pole layer are formed from a soft magnetic material chosen from the group of soft magnetic materials consisting of nickel-iron (Ni-Fe) alloys, iron-aluminum-silicon (Fe-Al-Si) alloys, cobalt (Co) base alloys and composites of nickel-iron (Ni-Fe) alloys, iron-aluminum-silicon (Fe-Al-Si) alloys and cobalt (Co) base alloys.

12. The method of claim 10 wherein:

the insulator layer is formed to a thickness of about 0.5 to about 1 microns; and the insulator layer is formed of an insulator material chosen from the group of insulator materials consisting of aluminum oxide insulator materials, silicon oxide insulator materials, silicon nitride insulator materials and silicon oxynitride insulator materials.

13. The method of claim 10 wherein two apertures are formed within the second air bearing surface to leave a remaining second edge centered along the second air bearing surface wherein:

the remaining second edge is from about 0.1 to about 4.0 microns in width; and the two apertures formed within the second air bearing surface each have a width adjoining the remaining second edge of from about 0.1 to about 2.0 microns, a length perpendicular to the remaining second edge of from about 0.1 to about 4.0 microns and a depth into second pole layer of from about 0.1 to about 5.0 microns.

14. The method of claim 10 wherein two apertures are formed within the first air bearing surface are to leave a remaining first edge of width equal to the second edge centered opposite the second edge wherein:

the remaining first edge is from about 0.1 to about 4.0 microns in width; and the two apertures formed within the first air bearing surface each have a width adjoining the remaining first edge of from about 0.1 to about 10 microns, a length perpendicular to the remaining first edge of from about 0.1 to about 2.0 microns and a depth into the first pole layer of from about 0.1 to about 5.0 microns.

15. The method of claim 14 wherein each of the two apertures formed within the first air bearing surface has a taper in the aperture at a location within the aperture furthest spaced from the second edge.

16. The method of claim 10 wherein two apertures are formed within the first air bearing surface and two apertures are formed within the second air bearing surface to leave a remaining second edge centered along the second air bearing surface and a remaining first edge of equal width centered opposite the remaining second edge wherein:

the remaining second edge is from about 0.1 to about 4.0 microns in width;

the two apertures formed within the second air bearing surface each have a width adjoining the remaining second edge of from about 0.1 to about 2.0 microns, a length perpendicular to the remaining second edge of from about 0.1 to about 4.0 microns and a depth into the second pole layer of from about 0.1 to about 5.0 microns;

the remaining first edge centered opposite the remaining second edge is from about 0.1 to about 4.0 microns in width; and the two apertures formed within the first air bearing surface each have a width adjoining the remaining first edge of from about 0.1 to about 10 microns, a length perpendicular to the remaining first edge of from about 0.1 to about 2.0 microns and a depth into the first pole layer of from about 0.1 to about 5.0 microns.

17. The method of claim 16 wherein each of the two apertures formed within the first air bearing surface has a taper in the aperture at a location within the aperture furthest spaced from the remaining second edge.

18. The method of claim 10 further comprising forming a third pole layer separated from the side of the first pole layer opposite the second pole layer by a second insulator layer, the second insulator layer having disposed therein a Magneto-Resistive (MR) sensor layer.

19. The method of claim 10 wherein the apertures formed within the first air bearing surface and the second air bearing surface are formed through an etching method chosen from the group of etching methods consisting of masked broadened ion beam etching methods, maskless focused ion beam etching methods and maskless laser beam etching methods.

20. The method of claim 19 wherein the maskless focused ion beam etching methods and the maskless laser beam etching methods include processes included from the group of processes consisting of gas-assisted processes and chemical-assisted processes.

* * * * *